US006829002B2

(12) United States Patent
Iwai

(10) Patent No.: US 6,829,002 B2
(45) Date of Patent: Dec. 7, 2004

(54) LASER SCANNING APPARATUS

(75) Inventor: Hitoshi Iwai, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/796,096

(22) Filed: Mar. 10, 2004

(65) Prior Publication Data

US 2004/0183894 A1 Sep. 23, 2004

(30) Foreign Application Priority Data

Mar. 19, 2003 (JP) ....................................... 2003-075760

(51) Int. Cl.[7] ............................ G02B 26/10; B41J 2/44
(52) U.S. Cl. ....................................... 347/263; 347/245
(58) Field of Search ................................ 347/263, 245, 347/241–243, 256–261

(56) References Cited

U.S. PATENT DOCUMENTS 5,414,492 A * 5/1995 Kubota ....................... 399/111
5,621,451 A * 4/1997 Sugiura et al. ............. 347/112

FOREIGN PATENT DOCUMENTS

| | | |
|---|---|---|
| JP | 9-236770 | 9/1997 |
| JP | 11-231250 | 8/1999 |
| JP | 2002-328326 | 11/2002 |

* cited by examiner

*Primary Examiner*—Huan Tran
(74) *Attorney, Agent, or Firm*—Fitzpatrick, Cella, Harper & Scinto

(57) ABSTRACT

A laser scanning apparatus, including: a laser light source; a rotary polygon mirror for deflecting a laser beam emitted from the laser light source for scanning; an imaging optical system for focusing the laser beam deflected by the rotary polygon mirror into an image; a containing member for containing the rotary polygon mirror and the imaging optical system; a first conductive cover member for closing a first opening portion of the containing member; a second conductive cover member for closing a second opening portion of the containing member; and conductive connection members for electrically connecting between the first conductive cover member and the second conductive cover member.

7 Claims, 7 Drawing Sheets

LASER SCANNING APPARATUS

BACKGROUND OF THE INVENTION

1. Field of the Invention

The present invention relates to a laser scanning apparatus suitably used in an image forming apparatus adopting an electrophotographic process, such as a copying machine or a printer.

2. Related Background Art

FIGS. 7A and 7B show an example of a structure of a laser scanning apparatus used in an image forming apparatus such as a copying machine or a printer.

FIGS. 7A and 7B are perspective views of the same laser scanning apparatus as viewed from an upper side and a lower side, respectively.

In FIG. 7A, laser beams outgoing from a laser device 10 as a light source pass through a collimator lens 11 to be converted into parallel beams. The parallel beams are converted into band-shaped beams extending in a main-scanning direction by a cylindrical lens 12. After that, the beams are reflected by a first folding mirror 13 and then deflected by a (rotary) polygon mirror 14. After that, the beams are caused to pass through fθ lenses 15 and 16, then reflected to bend toward a lower surface of the apparatus by a second folding mirror 17, and focused into an image on a photosensitive drum (not shown) through a third folding mirror 18, a toric lens 19, and a fourth folding mirror 20. To elaborate, the fθ lenses 15 and 16, the second folding mirror 17, the third folding mirror 18, the toric lens 19, and the fourth folding mirror 20 constitute an imaging optical system for focusing the laser beam into an image on the photosensitive drum. In this case, a photosensitive drum surface is scanned with the laser beam at a constant speed by the action of the fθ lenses 15 and 16. Those parts are mounted to a scanner case 2.

In general, any side of the scanner case 2 is widely opened, to which optical parts or components such as a polygon motor are incorporated. However, if it is left open, dust, toner, etc. are likely to adhere on the optical parts such as the mirror and the lens, thereby remarkably deteriorating optical performances. As a result, a satisfactory image cannot be formed. To cope with this, the parts are mounted thereto, after which the open side is covered with a cover member to keep the inside of the laser scanning apparatus airtight. To be specific, for the laser scanning apparatus having the structure as shown in FIGS. 7A and 7B, in which the parts are mounted to a case member from the upper and lower sides thereof, the upper and lower sides of the apparatus are both opened. Therefore, the cover members should be provided on both the sides of the scanning apparatus.

FIG. 8 shows an upper cover 3 and a lower cover 4 corresponding to both the open sides of the laser scanning apparatus of FIGS. 7A and 7B. For the cover member in a thin plate shape, a resin material or a metal material such as a steel plate can be generally used. However, if the cover member is large to some extent, the member made of the resin material easily deforms such as warping and hardly ensures the strength. Therefore, in many cases, the member is formed of the metal material such as a steel plate. The steel plate is a relatively low-cost material.

The laser scanning apparatus using the metal cover member has, of course, an advantage in that part accuracy such as flatness, a strength, etc. can be secured with ease and the cost is relatively low. On the other hand, however, the following problems are entailed.

In the laser scanning apparatus, when combining a resin scanner case with the metal cover member, a potential difference between the metal cover member and the scanner case develops. Unless being well grounded, the cover member may serve as an antenna for radiation noise generated from the laser scanning apparatus itself, for example, a drive substrate of a laser driver 21, a polygon motor driver 22, a BD sensor (not shown), etc. and a wire harness extending from the substrate or for radiation noise generated from an image forming apparatus main body to further amplify the noise, thereby affecting the image forming apparatus itself or peripheral electric devices, for example, causing a malfunction. From the very beginning, in the case of not attenuating the radiation noise, it is difficult to meet the standards for the radiation noise in countries, which are stipulated for the image forming apparatus.

Japanese Patent Application Laid-Open No. H9-236770 discloses an example of a measure to solve the foregoing problem of the radiation noise generated when the metal cover of the laser scanning apparatus is not well grounded.

Proposed in Japanese Patent Application Laid-Open No. H9-236770 is a laser scanning apparatus equipped with a polygon motor, a scanner case, an imaging optical system, and a metal cover, in which part of the cover member is grounded through a support part of the scanner case, and a ferrite core is further provided to the support part of the scanner case for reducing the radiation noise.

However, the proposal in Japanese Patent Application Laid-Open No. H9-236770 is made entirely on the assumption that the metal cover is provided only on the upper surface of a laser scanning apparatus unit. Therefore, if the same measure is attempted to apply to the laser scanning unit equipped with the metal covers for the upper side and the lower side (upper cover and lower cover) as mentioned in the conventional case, the upper cover and the lower cover respectively need to be grounded to the support part of the laser scanning apparatus. As a result, a cover shape and a frame structure are complicated. Also, installing the ferrite cores for both the covers requires a space, which is undesirable in terms of cost.

Also, it is conceivable that ground wires are connected to the upper and lower covers to ground the covers to the frame etc. of the image forming apparatus main body. In this case, however, for grounding them sufficiently enough to attenuate the noise, the ground wires are connected at the positions twice as many as those of the one-side cover. Thus, easiness of assembly and serviceability are largely impaired.

In addition, the resin scanner case is generally inferior to the metal case such as an aluminum case in mechanical strength and is thus unresistant to vibrations etc., leading to the deteriorated image quality.

SUMMARY OF THE INVENTION

The present invention has been made in view of the above-mentioned problem and has an object to provide a laser scanning apparatus capable of preventing occurrence of electromagnetic noise.

Another object of the present invention is to provide a laser scanning apparatus capable of grounding a conductive cover member for preventing the occurrence of the electromagnetic noise.

Still another object of the present invention is to provide a laser scanning apparatus, including: a laser light source; a rotary polygon mirror for deflecting a laser beam emitted from the laser light source for scanning; an imaging optical system for focusing the laser beam deflected by the rotary polygon mirror into an image; a containing member for containing the rotary polygon mirror and the imaging optical system; a first conductive cover member for closing a first opening portion of the containing member; a second conductive cover member for closing a second opening portion of the containing member; and conductive connection members for electrically connecting between the first conductive cover member and the second conductive cover member.

Other objects of the present invention will be apparent upon reading the following description taken in conjunction with the accompanying drawings.

DESCRIPTION OF THE PREFERRED EMBODIMENTS

Hereinafter, embodiments of the present invention will be described referring to the accompanying drawings.

First Embodiment

Figure 1:
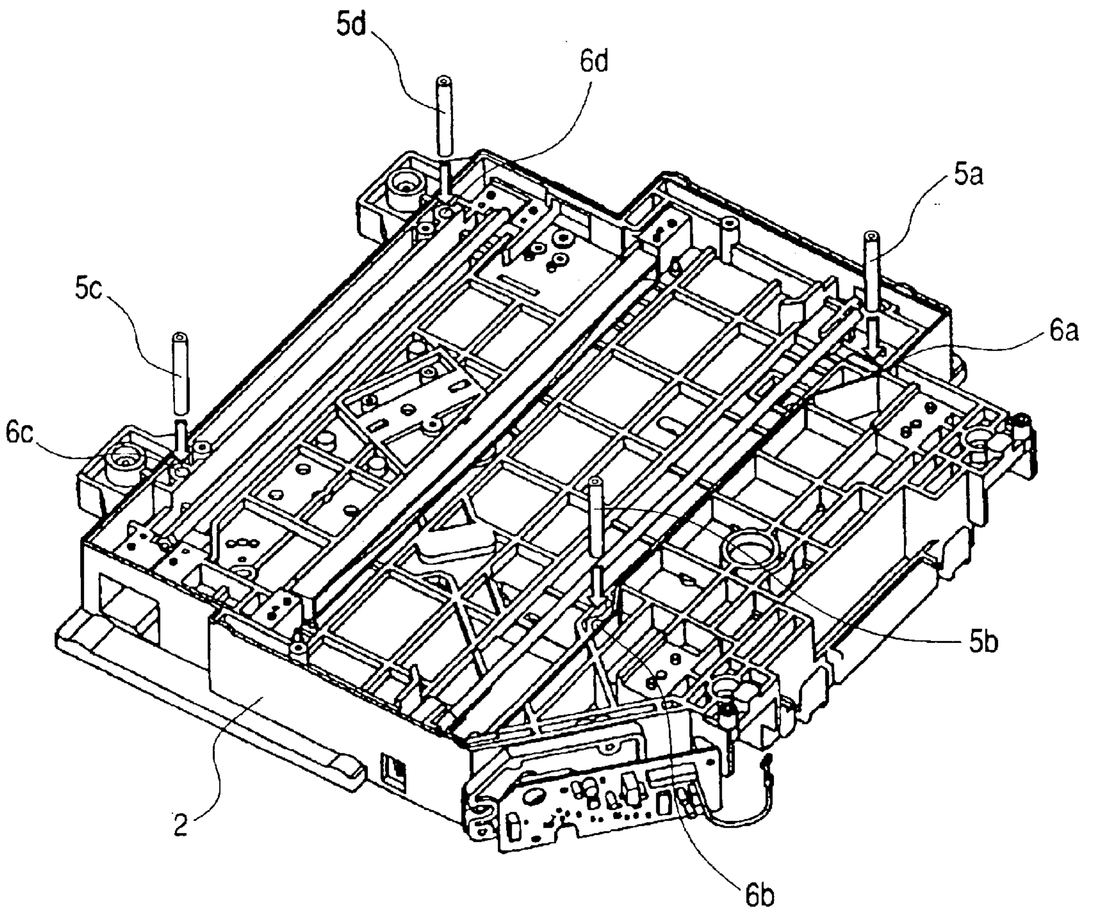
FIG. 1 is a perspective view of a laser scanning apparatus according to a first embodiment of the present invention.

FIG. 1 is a perspective view of a laser scanning apparatus, to which the present invention is applied, as viewed from a lower side. In FIG. 1, a cover for covering an opening portion of the lower surface of the apparatus is omitted for convenience of explanation. Here, a basic scanning mechanism of the laser scanning apparatus according to the present invention is the same as in the conventional one. Thus, the common parts are denoted by the same reference symbols and a detailed description thereof is omitted here. Also, the laser scanning apparatus according to this embodiment can be mounted to any image forming apparatus of an electrophotographic process having a known structure, such as a coping machine or a printer, and used for scanning a photosensitive drum (member) surface with a laser beam according to image information to form a latent image thereon.

In FIG. 1, a scanner case 2 constituted of an electrically insulating resin mold as a containing member has insertion openings 6 (6*a*, 6*b*, 6*c*, and 6*d*) through which metal poles 5 (5*a*, 5*b*, 5*c*, and 5*d*) for electrically connecting between an upper cover 3 and a lower cover 4 (FIG. 3) are inserted. In this case, the four metal poles 5 are arranged and the four insertion openings corresponding to the metal poles are formed in the scanner case 2. The insertion openings 6*a* to 6*d* constitute the openings of insertion holes 61 (61*a*, 61*b*, 61*c*, and 61*d*) passing through the scanner case 2 from the upper surface to the lower surface, on the lower surface side. Other openings are also formed in the upper surface (not shown) at corresponding positions. In FIG. 1, the metal poles 5 float in the air apart from the scanner case 2 but actually are inserted into the insertion holes 61 through the insertion openings 6 of the scanner case in the direction of the arrows. In this case, the upper cover 3 and the lower cover 4 correspond to the cover members.

Figure 2:
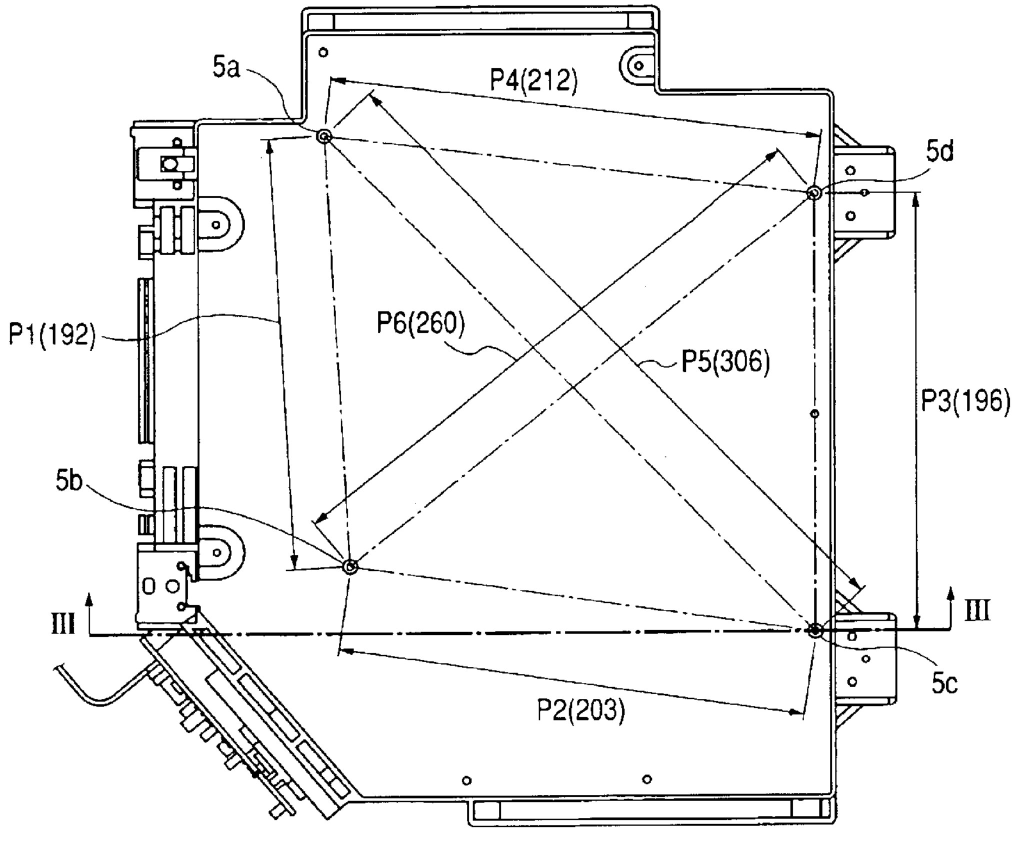
FIG. 2 is a top view showing the laser scanning apparatus according to the first embodiment of the present invention.
Figure 3:
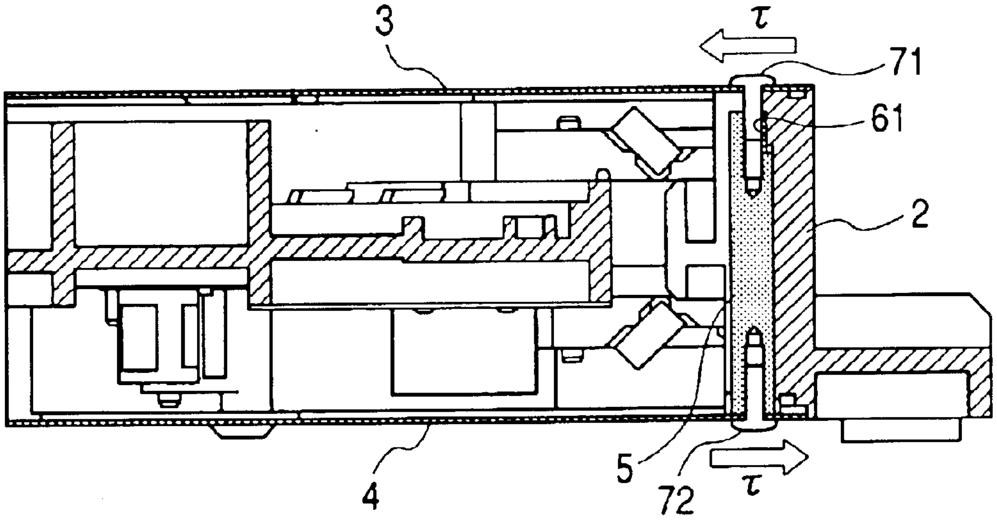
FIG. 3 is a partially sectional view taken along the line III-III of FIG. 2.

FIG. 2 is a top view showing the laser scanning apparatus to which the present invention is applied. The metal poles 5 are arranged at four positions as indicated by the arrows of FIG. 2. FIG. 3 is a partially sectional view of the laser scanning apparatus cut along the line III—III of the top view of FIG. 2, i.e., a sectional view taken along the line passing just a center of the insertion pole 5*c*. In FIG. 3, shaded portions correspond to a section of the scanner case 2 and a portion indicated by halftone dot corresponds to a section of the metal pole 5 (5*c*). The upper cover 3 and the lower cover 4 are shown in a thin plate shape. As shown in FIG. 3, both ends of the metal pole 5 are tapped. The upper cover 3 and the lower cover 4 can be secured to the metal pole 5 using metal screws 71 and 72. In this case, the metal pole 5 and the screws 71 and 72 constitute the conductive member. Also, the metal pole 5 corresponds to a columnar support member.

The metal pole 5 also partially functions as cover fixing means. This prevents an assembly procedure for the laser scanning apparatus from being much more complicated than before with the increased number of steps. Also, this embodiment adopts the cylindrical metal pole 5. Thus, the metal pole 5 is press-fitted into the scanner case 2 to ensure sufficient strength against rotation lest the metal pole 5 should rotate together with the screw upon fastening the covers with the screws. However, in the case where the scanner case 2 and the metal pole 5 are desired to be detached from each other with ease in consideration of a recycling efficiency etc., the metal pole may be formed to have a polygonal shape or a D-cut shape in section, for example, to thereby weaken the press-fitting strength and facilitate the separation.

Figure 8:
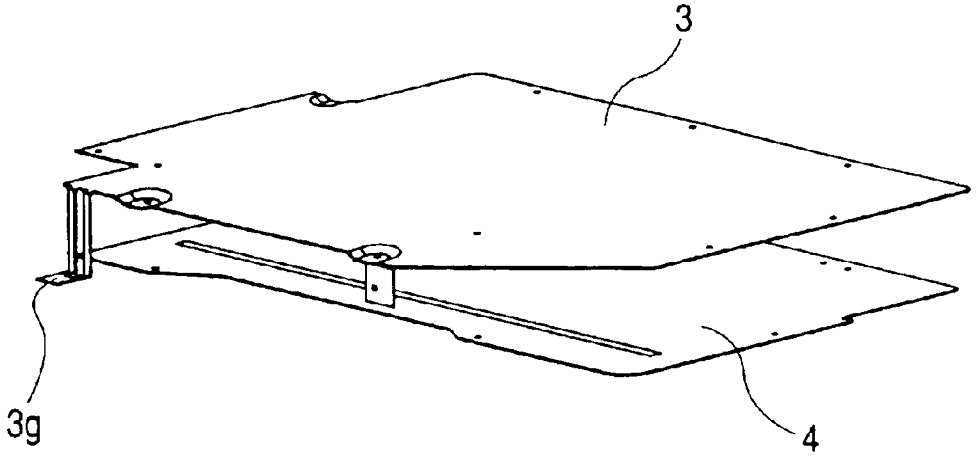
FIG. 8 is a perspective view showing a cover member of a laser scanning apparatus.

As shown in FIG. 8, a conductive part 3*g* to be arranged to an image forming apparatus main body frame as the support part of the laser scanning apparatus is formed on the upper cover 3 in an integrated manner. The upper cover is solely grounded through the conductive part 3*g*.

In the top view of FIG. 2, pitches between the metal poles are denoted by P (P1, P2, P3, P4, P5, and P6). It is generally known in the art that a distance between the ground positions is very important for reducing the unnecessary radiation noise as one of the problems to be solved by the present invention.

A frequency and a wavelength of radiation meet the following relationship:

$$\lambda[\mathrm{m}] = \frac{c[\mathrm{m/s}]}{f[\mathrm{Hz}\}}$$

λ: wavelength [m]

c: light velocity ($3\times10^8$ [m/s])

f: frequency [Hz]

It is known that resonance of the radiation is particularly liable to occur with an antenna (resonant antenna) length of ½-, ¼-, or ⅛-wavelength (λ).

On the other hand, with regard to noise control, VCCI standards (Japan), EN55022 standards (Europe), or noise standards in other countries, which are stipulated for an image forming apparatus, target a frequency range of the radiation noise for 30 MHz to 1 GHz. Substituting this value into the above relational expression between the wavelength and the frequency reveals that the wavelength of the radiation noise as the noise control target in the countries is 300 mm (i.e., frequency=1 GHz) at minimum, and the length of the antenna easily resonant to the noise frequency is 37.5 mm (i.e., $\lambda/8$) at minimum.

When the above is applied to the present invention, the pitch P shown in FIG. 2 corresponds to the antenna length. Thus, it is necessary to avoid a situation in which the pitch P between the metal poles corresponds to the length of the antenna easily resonant to the noise frequency concerned. More specifically, the pitch P between the metal poles is desirably set to a distance (length) excluding lengths of $\lambda/2$, $\lambda/4$, and $\lambda/8$, which easily allow the resonance to the noise frequency. For example, the pitch is set to at least ½ of the minimum resonant antenna length (37.5 mm) within the noise control target range, that is, to not less than 1/16 of the wavelength $\lambda$ of the radiation at the frequency of 1 GHz. If being adjusted to 1/16 or more of the wavelength $\lambda$, the pitch may theoretically equal none of the resonant antenna lengths with respect to the noise control target radiation.

Further, by arranging the metal pole near a noise generating source such as a laser driver, a polygon motor driver, a BD drive substrate, and a wire harness extending from the substrate, a more significant effect can be expected.

In this embodiment, as shown in FIG. 2, the plural metal poles 5 for electrically connecting between the upper cover 3 and the lower cover 4 are screwed to both the covers. The metal poles 5 are press-fitted into the scanner case 2. Here, it is assumed that a shearing stress $\tau$ acts on the scanner case 2 in the directions of the arrows of FIG. 3. Up to now, in such a case, a fastening force between the cover(s) and the scanner case and strength of the scanner case itself oppose the stress. However, with the structure of the present invention, a fastening force between the upper cover 3 and the lower cover 4, and the metal poles 5 is added. Further, the press-fitted surfaces of the metal poles 5 absorb the stress. Accordingly, the strength against the shearing stress can be remarkably increased as compared with the conventional case. The shearing stress normally develops, for example, in the case where the image forming apparatus vibrates. To elaborate, the increase in strength against the stress (i.e., vibration) leads to an improved image quality.

With the aforementioned structure, the following operations/effects can be attained in this embodiment.

The upper metal cover 3 and the lower metal cover 4 are fastened to each other by using the metal poles 5, whereby grounding only one of the two covers makes it possible to set potentials of both the upper cover 3 and the lower cover 4 to a ground level. Consequently, the emission of the unnecessary radiation noise can be avoided.

The metal pole 5 is inserted through the scanner case 2, making it unnecessary to perform a troublesome operation such as routing the ground wires for electrically connecting between the upper cover 3 and the lower cover 4 without impairing easiness of the assembly and the maintenance.

The metal pole 5 partially functions as the cover fixing means, whereby no special assembly procedure is necessary for electrically connecting between the upper cover 3 and the lower cover 4.

The metal poles 5 can be integrated into the scanner case 2, whereby the metal poles 5 function as reinforcing means for the scanner case 2 to enhance the strength of the scanner case 2.

Second Embodiment

Figure 4:
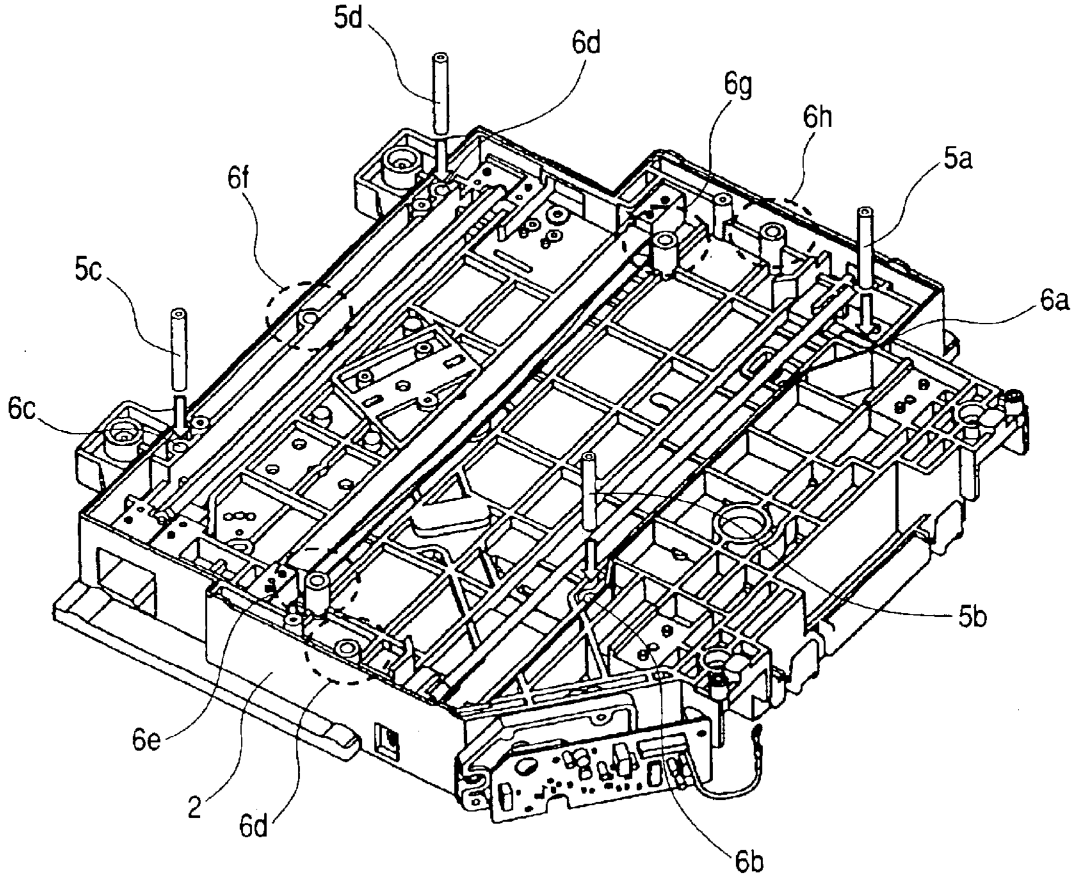
FIG. 4 is a perspective view showing a laser scanning apparatus according to a second embodiment of the present invention.

FIG. 4 is a perspective view showing a second embodiment of the present invention.

The scanner case 2 according to the second embodiment has insertion openings 6*e*, 6*f*, 6*g*, and 6*h*, through which no metal pole is inserted in addition to the insertion openings 6*a* to 6*d* through which the metal poles 5*a* to 5*d* are actually inserted upon the assembly of the laser scanning apparatus in a one-to-one relationship. That is, the number of formed insertion openings is beyond that of metal poles to be actually inserted.

In recent years, a technical idea of "modular design" has been widely adopted in the development of the image forming apparatus. As is standard, one unit is shared between the plural image forming apparatuses. However, needless to say, different image forming apparatuses differ from one another in terms of target radiation noise frequencies in many cases. In short, even if the metal poles are arranged so as to obtain the most significant effect with one image forming apparatus, there is a possibility that the sufficient effect cannot be attained when the laser scanning apparatus used in the image forming apparatus concerned is diverted to another image forming apparatus.

The second embodiment is devised in view of the above problems. In this embodiment, on the assumption that the laser scanning apparatus is mounted commonly to the plural image forming apparatuses, the insertion openings for the metal poles are formed in all positions as are effective positions for reducing the radiation noise in every image forming apparatus. The metal poles are selectively inserted while selecting the best arrangement of those insertion openings according to types (models) of the image forming apparatuses. More specifically, the metal poles are inserted through the insertion openings 6*e* to 6*h* of FIG. 4 in the case of mounting the laser scanning apparatus to another image forming apparatus having the different structure. With such a structure, even if the plural image forming apparatuses share one laser scanning apparatus, the arrangement of the ground positions which are most effective against the radiation noise of each image forming apparatus can be selected.

Third Embodiment

Figure 5:
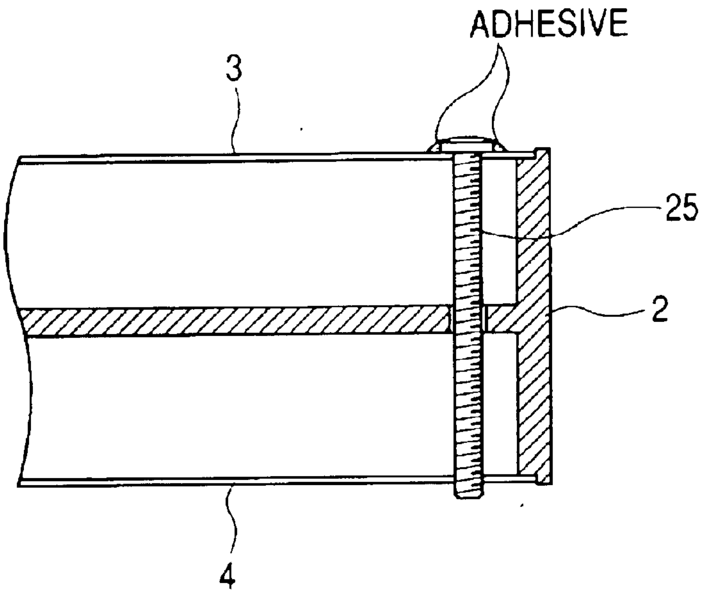
FIG. 5 is a partially sectional view showing a laser scanning apparatus according to a third embodiment of the present invention.

FIG. 5 shows a third embodiment of the present invention.

In the description of the above embodiments, the metal poles 5 for electrically connecting the upper cover 3 and the lower cover 4 are press-fitted to the scanner case 2, enabling the reduction of the unnecessary noise and the increase in strength of the scanner case 2. However, if the scanner case 2 has a sufficient strength and the unnecessary noise alone needs to be reduced, as shown in FIG. 5, one screw 25 may be merely inserted through the upper metal cover and the lower metal cover, after which adhesives etc. are used for preventing the rotation thereof.

Figure 6:
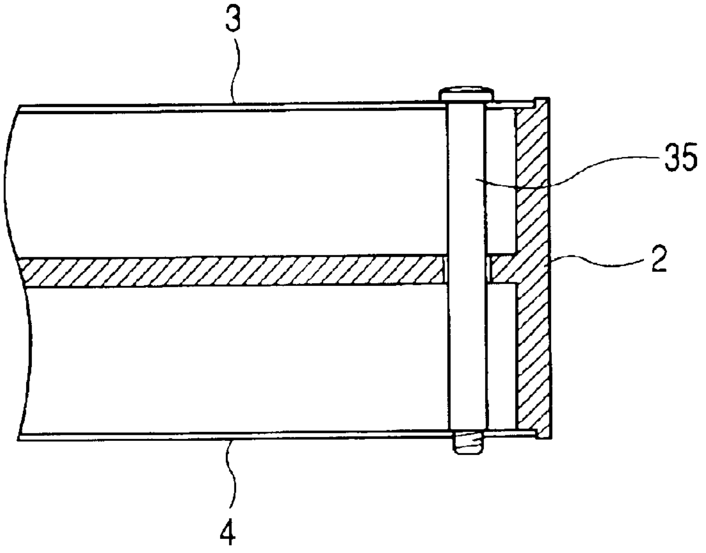
FIG. 6 shows a modification of the third embodiment according to the present invention.
Figure 7A:
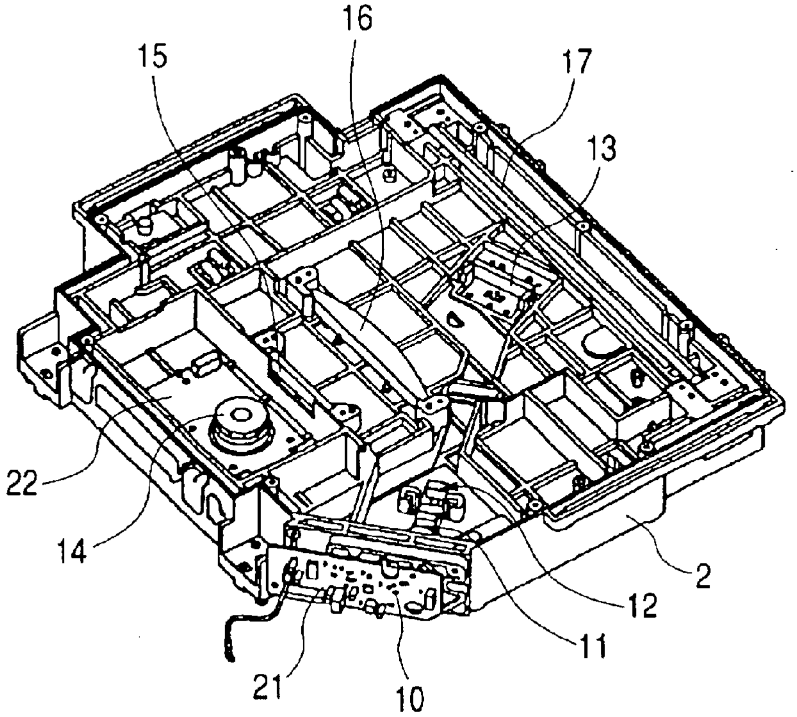
FIG. 7A is a perspective view of a laser scanning apparatus as viewed form an upper side.
Figure 7B:
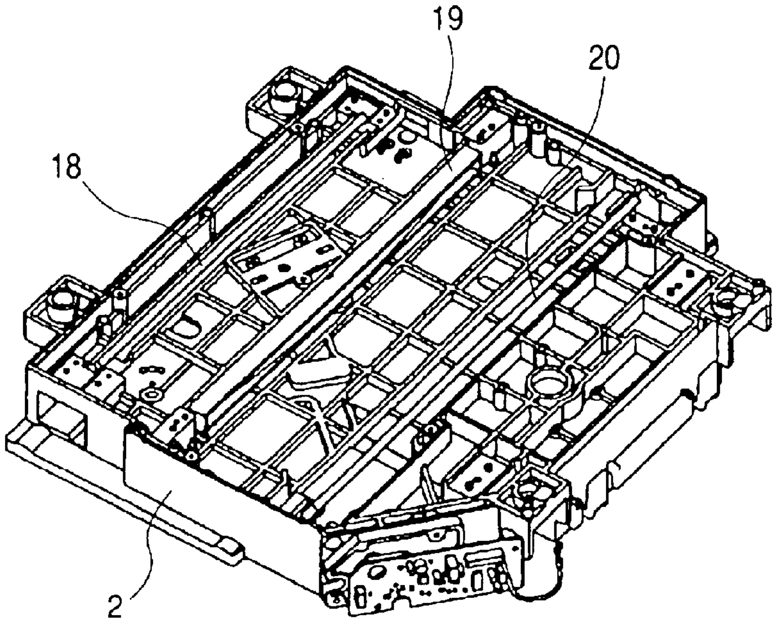
FIG. 7B is a perspective view of the laser scanning apparatus of FIG. 7A as viewed from a lower side.

Also, as shown in FIG. 6, the screw may be a stepped screw 35. In this case, the screw can be fastened with a sufficient screw torque, which makes it possible to dispense with the aforementioned abrasives for preventing the rotation and to further facilitate the assembly.

Further, using an electric wire having a conductivity compatible with the screw also enables the noise reduction as set forth. Note that in this case as well, the positions where the electric wires are secured to the covers are desirably determined such that the distance therebetween does not equal the aforementioned resonant antenna length.

As set forth, according to the present invention, in the laser scanning apparatus structured such that the opening portions of the containing member are covered with the plural conductive cover members, the cover members can be simply and surely grounded.

Hereinabove, although the embodiments of the present invention are described, the present invention is not limited to those embodiments but allows any modifications within the technical idea of the present invention.

What is claimed is:

1. A laser scanning apparatus, comprising:

a laser light source;

a rotary polygon mirror for deflecting a laser beam emitted from the laser light source for scanning;

an imaging optical system for focusing the laser beam deflected by the rotary polygon mirror into an image;

a containing member for containing the rotary polygon mirror and the imaging optical system;

a first conductive cover member for closing a first opening portion of the containing member;

a second conductive cover member for closing a second opening portion of the containing member; and a conductive connection member for electrically connecting between the first conductive cover member and the second conductive cover member.

2. A laser scanning apparatus according to claim 1, wherein the first conductive cover member covers an upper surface of the containing member and the second conductive cover member covers a lower surface of the containing member.

3. A laser scanning apparatus according to claim 1, comprising a plurality of conductive connection members, wherein a distance between the conductive connection members is set not to equal lengths of λ/2, λ/4, and λ/8 where λ represents a wavelength of a target radiation noise.

4. A laser scanning apparatus according to claim 1, wherein the conductive connection member has a mounting part for mounting the laser scanning apparatus to an apparatus in which the laser scanning apparatus is used.

5. A laser scanning apparatus according to claim 1, wherein the conductive connection member has a metal pole.

6. A laser scanning apparatus according to claim 5, wherein the metal pole is inserted through the containing member.

7. A laser scanning apparatus according to claim 1, wherein the laser scanning apparatus is used for an image forming apparatus having a photosensitive member and adapted to scan the photosensitive member with a laser beam according to image information to form a latent image on the photosensitive member.

* * * * *